United States Patent
Olson (12) 
(10) Patent No.: US 10,806,106 B2
(45) Date of Patent: Oct. 20, 2020

(54) SYSTEM, METHOD AND APPARATUS FOR PROVIDING A PULL-OUT FORCE COMPENSATING GEARBOX MOUNT

(71) Applicant: Valmont Industries, Inc., Omaha, NE (US)

(72) Inventor: Andrew T. Olson, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 28 days.

(21) Appl. No.: 16/364,498

(22) Filed: Mar. 26, 2019

(65) Prior Publication Data

US 2019/0297795 A1 Oct. 3, 2019

Related U.S. Application Data

(60) Provisional application No. 62/651,924, filed on Apr. 3, 2018.

(51) Int. Cl.
| | |
|---|---|
| *A01G 25/09* | (2006.01) |
| *B60K 17/04* | (2006.01) |
| *B62D 17/00* | (2006.01) |
| *B60K 1/00* | (2006.01) |

(52) U.S. Cl.
CPC ............ *A01G 25/09* (2013.01); *B60K 17/043* (2013.01); *B62D 17/00* (2013.01); *B60K 1/00* (2013.01); *B60Y 2200/224* (2013.01)

(58) Field of Classification Search
CPC .... A01G 25/09; A01G 25/092; B60K 17/043; B60K 1/00; B62D 17/00; B60Y 2200/224

USPC ................ 239/735, 737, 738, 743, 744, 747
See application file for complete search history.

(56) References Cited

U.S. PATENT DOCUMENTS

| | | | |
|---|---|---|---|
| 3,720,374 A | 3/1973 | Ross | |
| 3,752,495 A | 8/1973 | Ross | |
| 3,766,937 A * | 10/1973 | Lundvall | A01G 25/092 239/731 |
| 3,771,719 A * | 11/1973 | Raso | A01G 25/092 239/728 |
| 3,784,106 A | 1/1974 | Ross | |
| RE28,727 E * | 3/1976 | Reinke | A01G 25/09 239/731 |
| 4,434,936 A | 3/1984 | Chapman et al. | |
| 4,971,348 A | 11/1990 | Oyama et al. | |
| 6,257,604 B1 | 7/2001 | Laurent et al. | |
| 6,275,753 B1 | 8/2001 | Kyrtsos | |
| 6,386,553 B2 | 5/2002 | Zetterström | |
| 6,406,036 B1 | 6/2002 | Laurent et al. | |
| 6,811,168 B2 | 11/2004 | Acker et al. | |

(Continued)

*Primary Examiner* — Christopher S Kim
(74) *Attorney, Agent, or Firm* — Milligan PC LLO (57) ABSTRACT

The present invention provides a pull-out force compensating gearbox mount for an irrigation machine. According to an exemplary preferred embodiment, the present invention provides a system to counteract pull-out forces by inducing camber into the wheel gearbox and thus the tire. According to a further preferred embodiment, the tire of the present invention preferably begins to camber as a result of excessive pull-out force, with the bottom of the tire moving outwards relative to the top of the tire. This camber action is preferably applied to mitigate the pull-out forces. According to a further preferred embodiment, when excessive pull-out forces are reduced, the tire is then returned to its original position.

1 Claim, 8 Drawing Sheets

(56) References Cited

U.S. PATENT DOCUMENTS

| | | |
|---|---|---|
| 7,914,020 B2 | 3/2011 | Boston |
| 8,162,332 B2 | 4/2012 | Michel et al. |
| 8,322,729 B2 | 12/2012 | Michel et al. |
| 8,500,133 B2 | 8/2013 | Michel et al. |
| 8,973,930 B2 | 3/2015 | Rhodig |
| 9,387,880 B2 | 7/2016 | Gano |
| 9,630,650 B2 | 4/2017 | Pfeiffer |
| 2003/0011157 A1 | 1/2003 | Aubarede et al. |
| 2010/0148570 A1* | 6/2010 | Lanser ................. B60B 3/16 301/111.04 |
| 2010/0320706 A1 | 12/2010 | Horiguchi et al. |
| 2017/0210435 A1 | 7/2017 | Lykken |

\* cited by examiner

SYSTEM, METHOD AND APPARATUS FOR PROVIDING A PULL-OUT FORCE COMPENSATING GEARBOX MOUNT

RELATED APPLICATIONS

The present application claims priority to U.S. Provisional Application No. 62/651,924 filed Apr. 3, 2018.

BACKGROUND AND FIELD OF THE PRESENT INVENTION

Field of the Present Invention

The present invention relates generally to irrigation machines and, more particularly, to a system, method and apparatus for providing a pull-out force compensating gearbox mount.

Background of the Invention

Modern field irrigation machines are combinations of drive systems and sprinkler systems. Generally, these systems are divided into two types depending on the type of travel they are designed to execute: center pivot and/or linear.

Regardless of being center pivot or linear, common irrigation machines most often include an overhead sprinkler irrigation system consisting of several segments of pipe (usually galvanized steel or aluminum) joined together and supported by trusses, mounted on wheeled towers with sprinklers positioned along its length. These machines move in a circular pattern (if center pivot) or linearly; and are fed with water from an outside source (i.e. a well or water line). The essential function of an irrigation machine is to apply an applicant (i.e. water or other solution) to a given location.

Most spans used in the mechanized irrigation industry are of the bowstring truss design. This design is excellent at handling pull-out forces imparted by the drive units, however, when excessive forces are incurred resulting from certain field terrain, structural damage can occur to the span, drive unit legs or other parts of the system for which it is connected.

Camber angle is the angle made by the wheels of a vehicle. Specifically, it is the angle between the vertical axis of the wheels used for steering and the vertical axis of the vehicle when viewed from the front or rear. It is used in the design of steering and suspension. If the top of the wheel is farther out than the bottom (that is, away from the axle), it is called positive camber; if the bottom of the wheel is farther out than the top, it is called negative camber.

Traditional systems as known in the prior art are intended to detect, control and reduce camber within wheeled systems. For example, U.S. Pat. No. 4,971,348A teaches a camber control system for a motor vehicle which includes upper and lower coupling members interconnecting with a wheel supporting member and body of vehicle. Similarly, U.S. Pat. No. 6,275,753B1 teaches a vehicle wheel misalignment detection and compensation method which involves comparing alignment functions and to detect camber angle and wheel misalignment. Similarly, U.S. Pat. No. 8,322,729B2 teaches a system for adjusting the camber of a wheel suspension for a motor vehicle which includes rotary parts moved by a drive and actuator in both directions of rotation.

Although detecting and controlling camber is known in the prior art, there are no systems which teach or suggest a pull-out force compensating gearbox mount to effectively mitigate excessive pull-out forces imparted on irrigation spans to prevent structural damage.

In order to overcome the limitations of the prior art, a system is needed which is able to effectively compensate for excessive pull-out forces applied to the irrigation assembly during irrigation operations.

SUMMARY OF THE DISCLOSURE

To minimize the limitations found in the prior art, and to minimize other limitations that will be apparent upon the reading of the specifications, the present invention provides a system to counteract pull-out forces by inducing camber into the wheel gearbox and thus the tire. According to a further preferred embodiment, the tire of the present invention preferably begins to camber as a result of excessive pull-out force, with the bottom of the tire moving outwards relative to the top of the tire. This camber action is preferably applied to mitigate the pull-out forces. According to a further preferred embodiment, when excessive pull-out forces are reduced, the tire then is mechanically returned to a more neutral position.

According to a further preferred embodiment, the camber of the tire varies in proportion to the pull out load applied to the bottom of the tire, where loads may be applied due to traversing local terrain (e.g. crop ridges required for cultivation of certain crops, rocks, debris or the like). As the camber decreases, the instantaneous direction of travel of the tire is redirected slightly toward the applied load. As a result of this change in direction, the applied load may decrease as the tire attacks and climbs over the terrain causing the excessive load at a sharper angle.

According to a further preferred embodiment, the mechanism of the present invention preferably consists of a pivoting mechanism to allow camber movement of the wheel gearbox and/or tire and a spring device.

According to a further preferred embodiment, the present invention is designed for use within a self-propelled irrigation system having at least one span and a drive tower including a drive shaft, a drive wheel gearbox, a drive wheel and a drive motor connected to the drive shaft. According to a further preferred embodiment, the present invention further comprises a tension wheel mount assembly including a first tower side arm and a second wheel side arm which are integrally connected at a first upper hinge point. According to a further preferred embodiment, the first tower side arm and the second wheel side arm both further include a drive shaft receiving port integrated into and/or co-axial with the hinge point, allowing the drive shaft to pass through so as to ensure the hinge axis is coincident with the driveshaft axis so as to minimize or eliminate changes in driveshaft angle as the tension wheel mount assembly operates. Note: Having the axes coincident is not a necessary for proper operation of the invention, but is merely a preferred embodiment. According to a further preferred embodiment, the second wheel side arm is secured to and aligned with the wheel gearbox. According to a further preferred embodiment, the tension wheel mount assembly of the present invention preferably further includes one or more retaining bolt and a tension spring assemblies which respond to a pull-out force applied to the drive tower. According to a further preferred embodiment, in response to a pull-out force, the tension spring is compressed by the first tower side arm and the second wheel side arm moves away from the first tower side arm thereby causing the camber of the drive wheel gearbox and the drive wheel to become less positive.

DESCRIPTION OF THE PREFERRED EMBODIMENTS

Reference is now made in detail to the exemplary embodiments of the invention, examples of which are illustrated in the accompanying drawings. Wherever possible, the same reference numbers will be used throughout the drawings to refer to the same or like parts. The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. As used throughout this application, the word "may" is used in a permissive sense (i.e., meaning "having the potential to"), rather than the mandatory sense (i.e. meaning "must").

Additionally, any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

Figure 1:
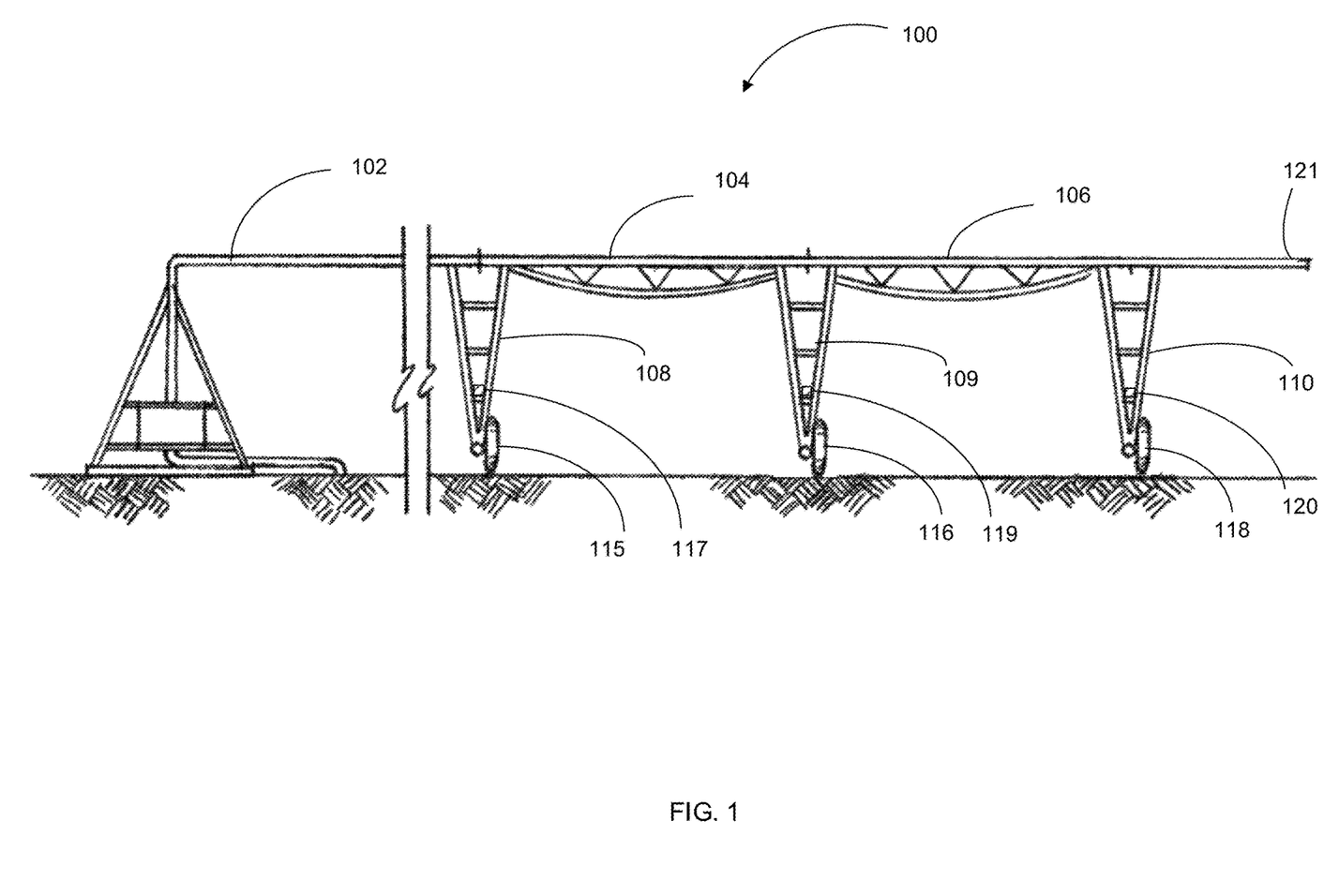
FIG. 1 shows an exemplary irrigation system for use with the present invention.

FIG. 1 illustrates an exemplary self-propelled irrigation system 100 which may be used with example implementations of the present invention. As should be understood, the irrigation system 100 disclosed in FIG. 1 is an exemplary irrigation system onto which the features of the present invention may be integrated. Accordingly, FIG. 1 is intended to be purely illustrative and any of a variety of systems (i.e. fixed systems as well as linear and center pivot self-propelled irrigation systems; stationary systems; corner systems) may be used with the present invention without limitation. For example, although FIG. 1 is shown as a center pivot irrigation system, the exemplary irrigation system 100 of the present invention may also be implemented as a linear irrigation system. The example irrigation system 100 is not intended to limit or define the scope of the present invention in any way. According to further preferred embodiments, the present invention may be used with a variety of motor types such as gas powered, DC powered, switch reluctance, single phase AC and the like.

With reference now to FIG. 1, spans 102, 104, 106 are shown supported by drive towers 108, 109, 110. Further, each drive tower 108, 109, 110 is shown with respective motors 117, 119, 120 which provide torque to the drive wheels 115, 116, 118. According to alternative embodiments of the present invention, a single irrigation machine may use one or more drive towers in accordance with the present invention in combination with any of a variety of other types of drive towers (including unmotorized) without departing from the scope of the present invention.

As shown in FIG. 1, the irrigation machine 100 may preferably further include an extension/overhang 121 which may include an end gun (not shown). In an implementation, the end gun is a suitable pressure sprayer configured to be activated at the corners of a field or other designated area to increase the amount of land that can be irrigated.

With reference now to FIGS. 2-6, the present invention teaches a pull-out force compensating gearbox mount to mitigate excessive pull-out forces imparted on irrigation spans during irrigation operations. As should be understood, the irrigation systems discussed with respect to FIGS. 2-6 are exemplary irrigation systems into which the features of the present invention may be integrated. Accordingly, FIGS. 2-6 are intended to be illustrative and any of a variety of alternative irrigation systems, motors and drive systems may be used with the present invention. The arrangements shown in FIGS. 2-6 are not intended to limit the scope of the present invention in any way. Further, according to alternative embodiments of the present invention, a single irrigation machine may use one or more drive towers in accordance with the present invention in combination with any of a variety of other types of drive towers (including unmotorized) without departing from the scope of the present invention.

Figure 2:
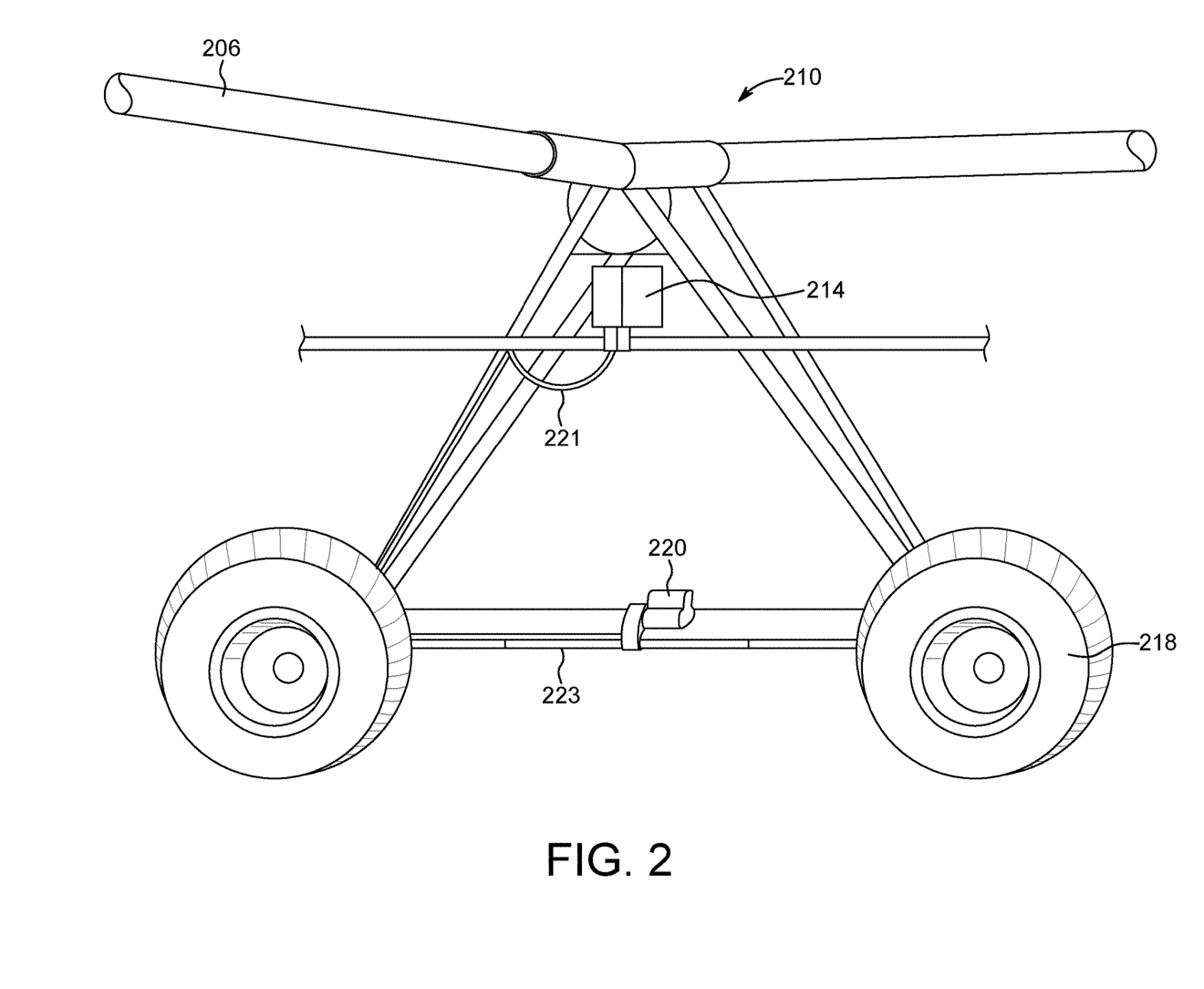
FIG. 2 shows a lateral view of an exemplary drive tower in accordance with a first preferred embodiment of the present invention.

With reference now to FIG. 2, a lateral view of an exemplary drive tower 210 supporting a span 206 in accordance with a first preferred embodiment of the present invention is provided. As shown, an exemplary drive tower 210 may preferably include a drive controller 214 which is electrically connected via a wire 221 which includes one or more electrical lines for providing power transmission to a drive motor 220. As further shown, the drive motor 220 may preferably be mechanically engaged with a drive shaft 223 which applies torque to one more drive wheels 218.

Figure 3A:
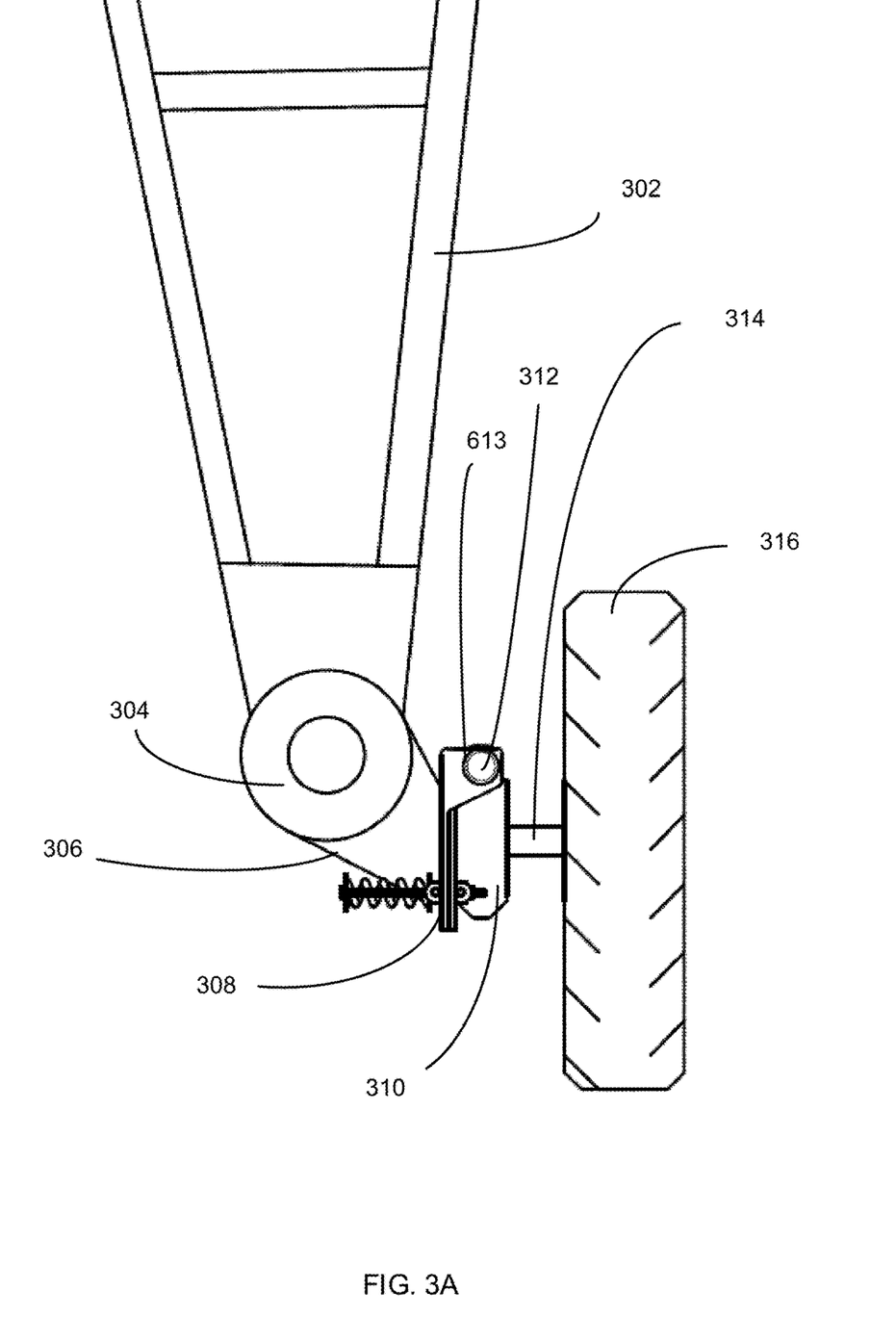
FIG. 3A shows a front-end view of an exemplary drive tower leg including a wheel connection assembly of the present invention in a less positively cambered position.
Figure 3B:
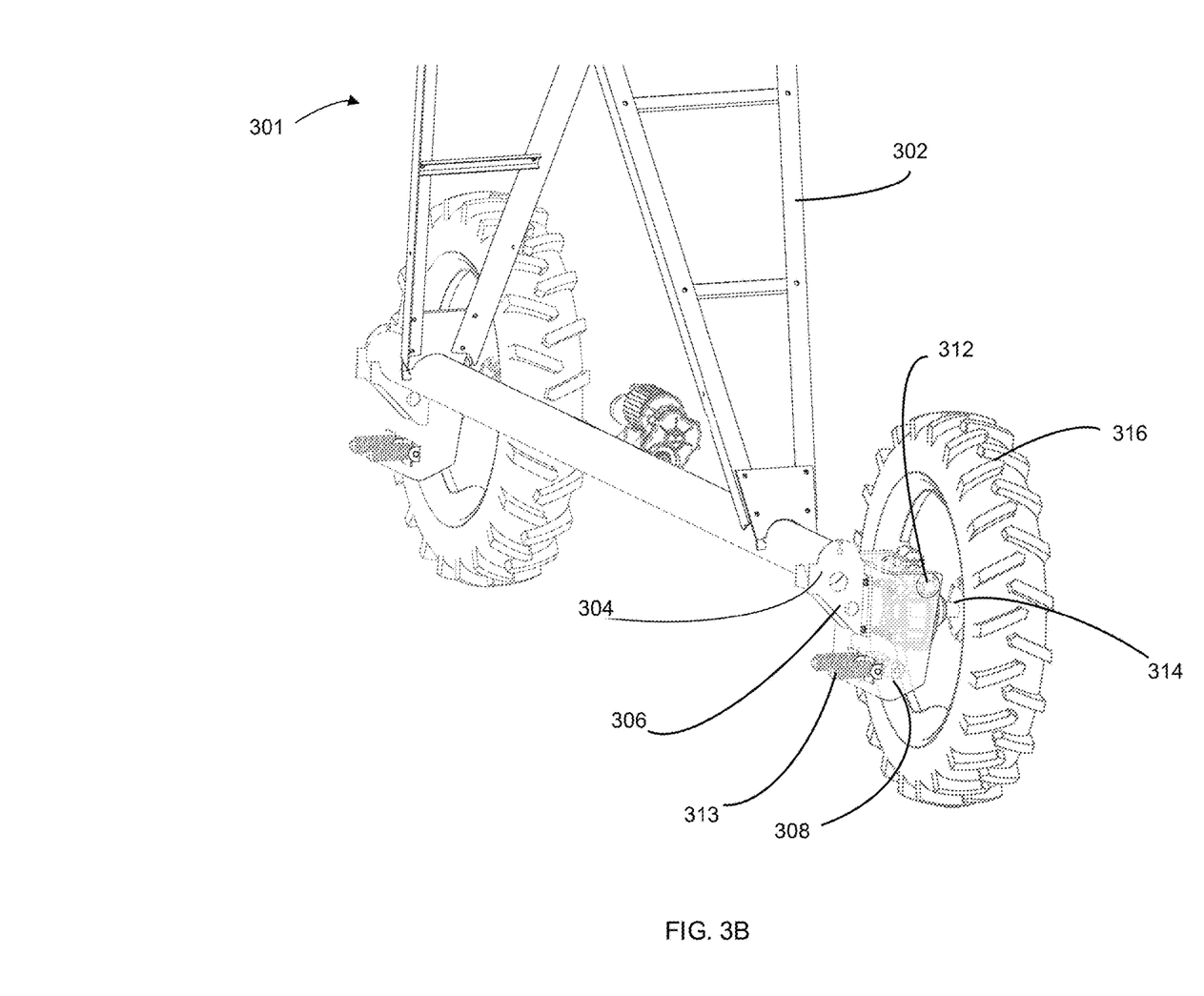
FIG. 3B shows perspective front-end view of an exemplary drive tower leg including a wheel connection assembly of the present invention in a less positively cambered position.

With reference now to FIGS. 3A and 3B, exemplary front-end views of an exemplary drive tower leg 302 are shown including a wheel connection assembly of the present invention in a lower cambered position. FIG. 3A provides a general, diagrammatic view and FIG. 3B provides a more detailed, perspective view. FIGS. 3A and 3B include a drive tower leg 302 connected to a base beam 304 which is further attached to a gearbox mount 306. According to alternative preferred embodiments, the base beam 304 and the gearbox mount 306 may be of any of a variety of alternative designs and configurations without departing from the scope of the present invention. As further shown in FIGS. 3A and 3B, a tension mount 308 of the present invention is preferably secured between the gearbox mount 306 and the wheel gearbox 310. As shown in FIG. 3B, the exemplary tension mount 308 of the present invention may include a pair of spring elements 313. As further disclosed, the tension mount 308 of the present invention may alternatively include one or more spring elements 313 without departing from the scope of the present invention. According to alternative embodiments, the drive shaft 312 may preferably sit atop the wheel gearbox 310.

As further shown in FIGS. 3A and 3B, the tension mount 308 preferably further receives the drive shaft 312 (shown in FIG. 2 as drive shaft 223) and secures the drive shaft 312 in mechanical connection with the wheel gearbox 310. According to a preferred embodiment, the drive shaft 312 preferably terminates in a universal joint and input shaft (i.e. hinge point 613), which preferably is integrally attached to drive gears (not shown) within the gearbox 310 and which thereby provides torque to the axle shaft 314, which in turn translates the provided torque to the wheel 316. As shown in FIGS. 3A and 3B, the tension mount 308 is in a closed position and the wheel 316 is held in a more vertical, lower cambered position.

Figure 4A:
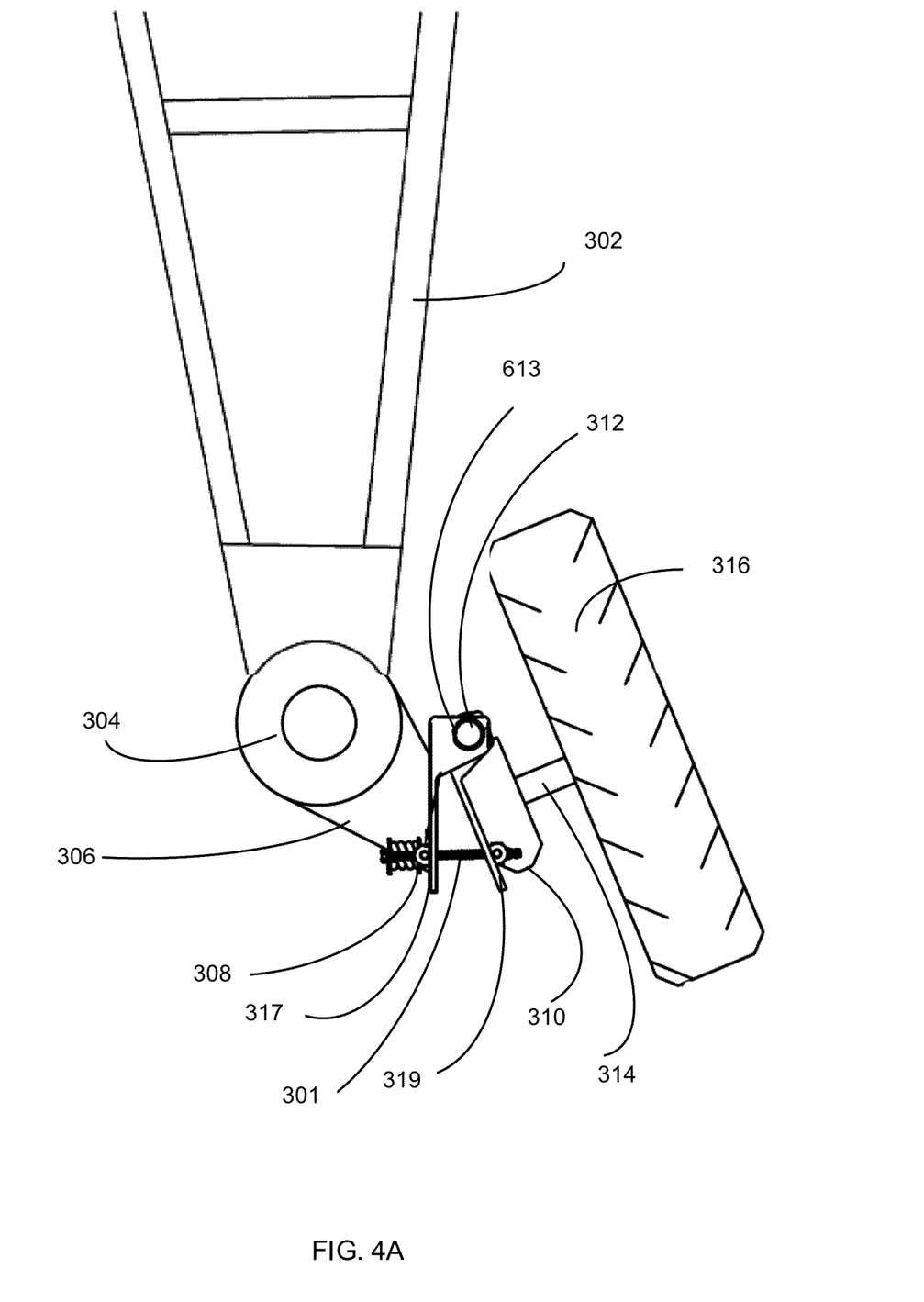
FIG. 4A shows a front-end view of the exemplary drive tower leg shown in FIG. 3A in a more positively cambered position.
Figure 4B:
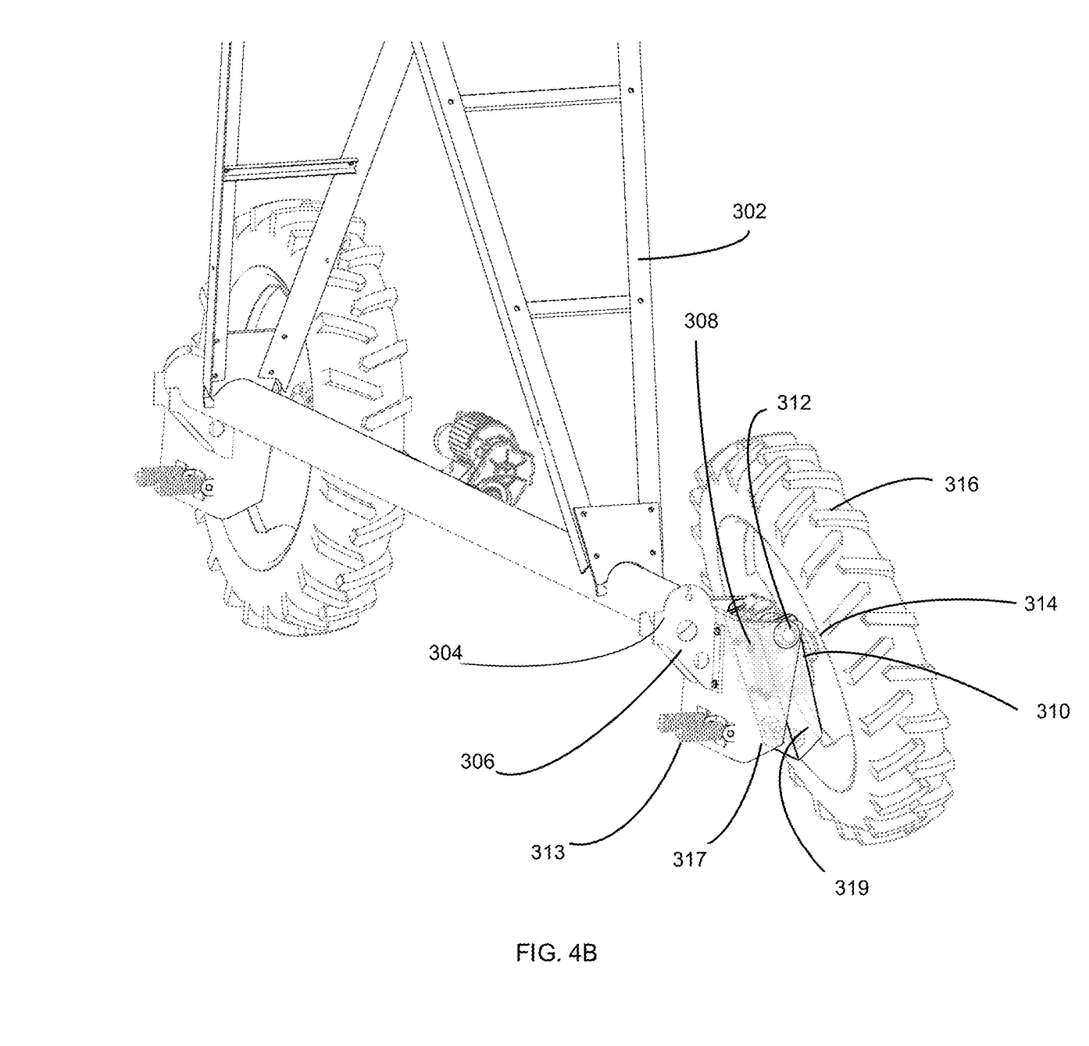
FIG. 4B shows a perspective front-end view of the exemplary drive tower leg shown in FIG. 3B in a more positively cambered position.

With reference now to FIGS. 4A and 4B, a front-end view of the exemplary drive tower leg 302 shown in FIGS. 3A and 3B is shown. FIG. 4A provides a general, diagrammatic view and FIG. 4B provides a more detailed, perspective view. FIGS. 4A and 4B show the tension mount 308 of the present invention in an open, negatively cambered position. The tension mount 308 shown in FIG. 4B is shown without the retaining bolt 301 for purposes of illustration.

As shown in FIGS. 4A and 4B, the tension mount 308 of the present invention is shown secured between the gearbox mount 306 and the wheel gearbox 310 with the drive shaft 312 inserted within the tension mount 308. As shown, the tension mount 308 is in an open position in which the wheel gearbox 310 is pivoted away from the base beam 304 and the bottom of the wheel 316 is moved from a more positive camber to a more negative camber (i.e. as shown the bottom of the wheel is positioned farther out from the drive shaft 312 than the top of the wheel). In this open, more negative camber position, it is important that the drive shaft 312 remains in mechanical connection with wheel gearbox 310. As explained in more detail below, the tension spring 308 may preferably include a tower side arm 317 and a wheel side arm 319 which are rotationally connected at an upper hinge point. As shown in FIG. 4B, the tower side arm 317 and the wheel side arm 319 may each be incorporated within larger surfaces which may act to enclose and cover portions of the inner spring mechanism and/or the retaining bolt 301.

According to further preferred embodiments of the present invention, it should be understood that the wheel angle when the tension mount 308 is in a closed position may actually be positive, neutral or negative depending on the desired steering and suspension of a given drive tower. From the initial camber of the wheel angle, in response to pull-out forces, the tension mount 308 is preferably tensioned to allow the tension mount to move to an open position and thereby allow the bottom of the tire to extend out moving from a more positive to a less positive camber angle. Accordingly, as used herein, moving from an uncambered position to a cambered position is understood to mean moving from a more positive camber angle to a less positive camber angle. For instance, moving from a camber angle of −1° to −10° or from 80° to 20°.

Figure 5:
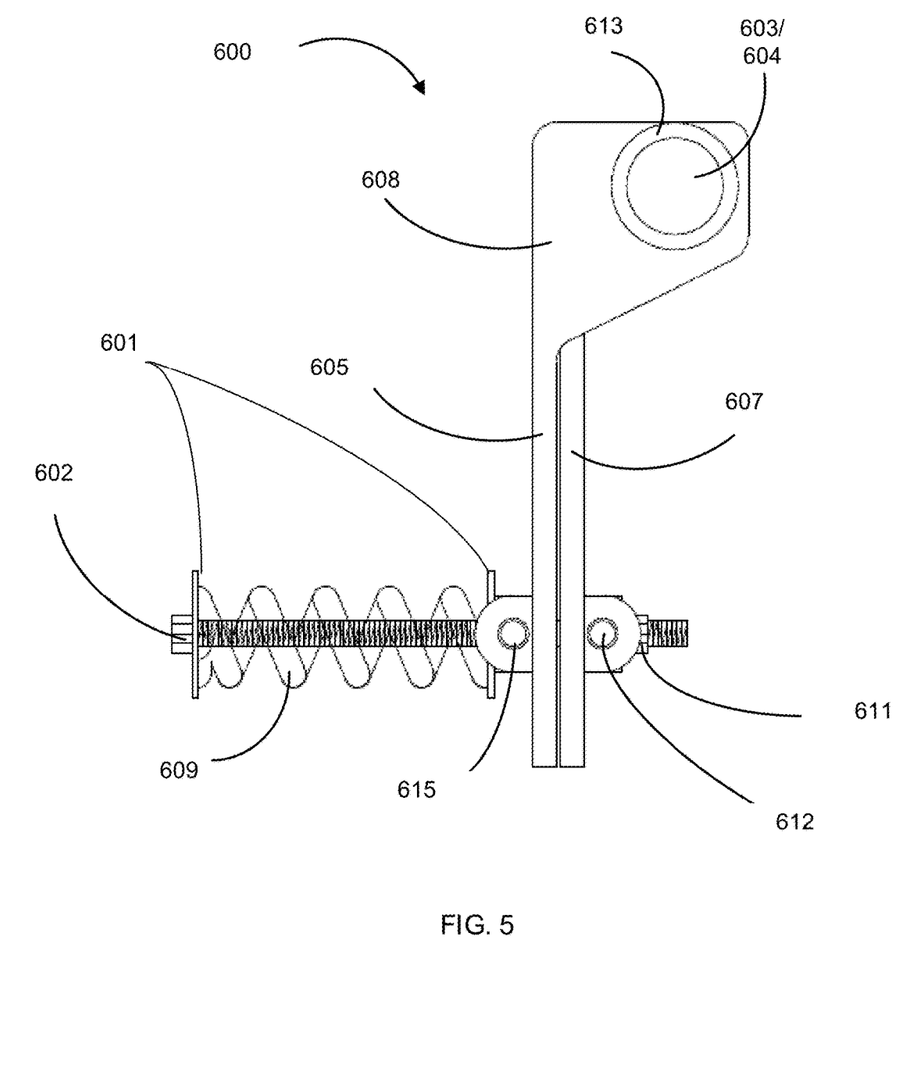
FIG. 5 shows an exemplary tension wheel mount assembly of the present invention in a closed, uncambered position.

FIG. 5 shows an exemplary tension wheel mount assembly 600 of the present invention in a closed, uncambered position. As shown, an exemplary tension wheel mount assembly 600 of the present invention may preferably include a tower side arm 605 including an upper section 608 having a drive shaft receiving port 604 and which is further rotationally connected at a lower pivot point 615. Further, the tension wheel mount assembly 600 preferably further includes a wheel side arm 607 which includes an upper section 617 (shown in FIG. 6) having a drive shaft receiving port 603 (overlapping with receiving port 604). As further shown, the wheel side arm 607 is preferably rotationally connected to the tower side arm 605 at an upper hinge point 613 and further rotationally connected to a lower pivot point 612. As further shown in FIG. 5, the retaining bolt 602 preferably acts to retain a tension spring 609 between a pair of retaining surfaces 601 which may be formed from washers, welded plates or the like. The retaining bolt 602 preferably extends through the tension wheel mount assembly 600 and may preferably be further secured by a securing nut 611.

Figure 6:
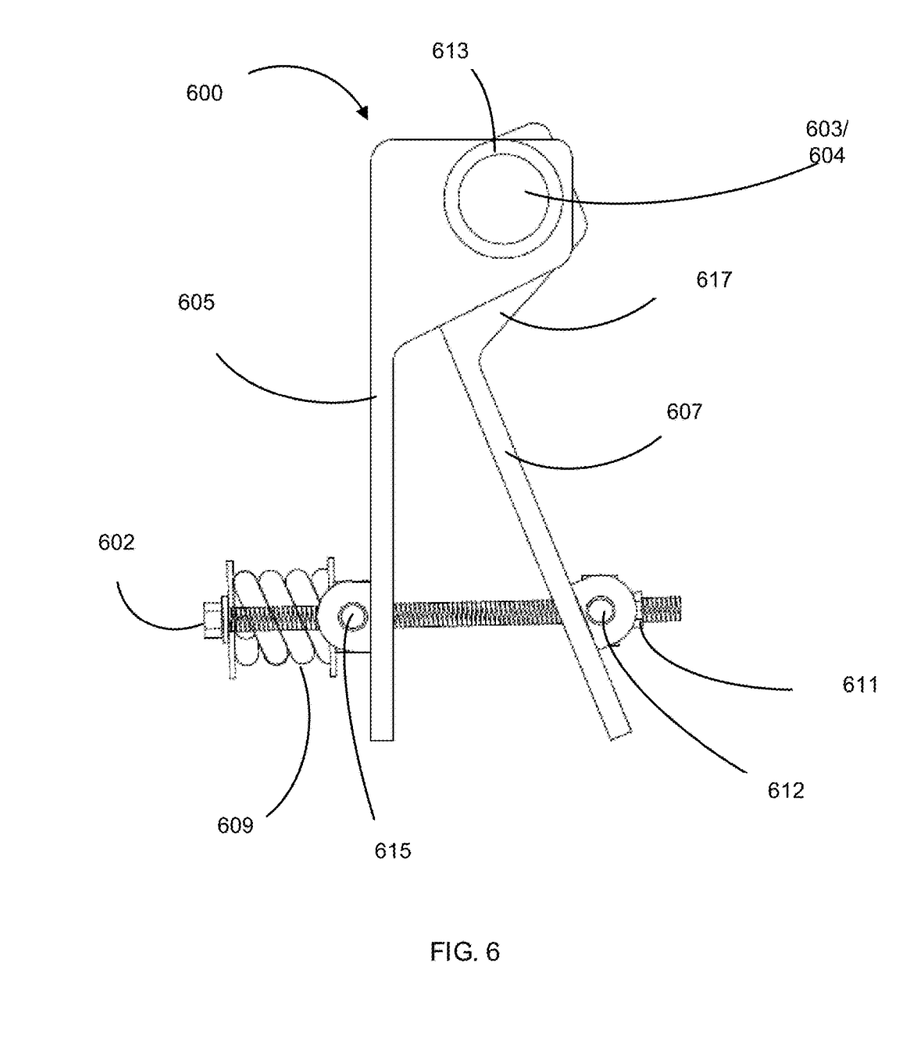
FIG. 6 shows an exemplary tension wheel mount assembly of the present invention in an open, cambered position.

With reference now to FIG. 6, the tension wheel mount assembly 600 of the present invention is shown in an open, cambered position. In this position, as shown in FIG. 6, in response to pull-out forces, the tension spring 609 is preferably compressed and the wheel side arm 607 and tower side arm 605 are extended from one another. According to a preferred embodiment, the compressed tension spring 609 preferably provides sufficient force to restore the tire to the uncambered position when the excessive force is removed. According to a further preferred embodiment, the wheel side arm 607 and the tower side arm 605 preferably are allowed to independently rotate around a shared hinge point 613 which encloses the drive shaft opening 603/604. Further, the tower side arm 605 and the wheel side arm 607 are connected to the retaining bolt 602 at pivot points 615 and 612 respectively. Pivot points 615 and 612 preferably provide the necessary freedom to allow the arms 605 and 607 to rotate about hinge point 613 while remaining attached to the retaining bolt 602.

As shown in FIGS. 4A and 4B, with the lateral extension between the tower side arm 605 and the wheel side arm 607, the wheel gearbox 310, axle shaft 314 and wheel 316 are each moved outward from the tower legs 302 so that the camber of the wheel is moved from a more positive camber to a less positive camber. Conversely, when the pull-out forces are reduced, the tension spring 609 preferably decompresses and the side arms 605 and 607 are forced together (as shown in FIGS. 3A and 3B) resulting in a more positive camber angle for the attached wheel 316. According to preferred embodiments of the present invention, in both the closed, uncambered position and the open, cambered position, the hinge point 613 preferably remains aligned with wheel gearbox input drive shaft axis, so that torque may be continuously applied to the wheel.

The scope of the present invention should be determined not by the embodiments illustrated, but by the appended claims and their legal equivalents.

What is claimed is:
1. In a self-propelled irrigation system having at least one span, a drive tower, a drive shaft, a drive wheel gearbox, a drive wheel, and a drive motor, a gearbox mount comprising:
   a first tower side arm;
   a second wheel side arm; wherein the first tower side arm and the second wheel side arm are integrally connected at a first upper hinge point; further wherein the first tower side arm and the second wheel side arm are each further comprised of a drive shaft receiving port for receiving the drive shaft; further wherein the second wheel side arm is secured to and aligned with the wheel gearbox;

a retaining bolt, wherein the retaining bolt comprises a head, a central length and a securing nut;

a first retaining surface;

a second retaining surface; and a tension spring, wherein the tension spring is comprised of a spiral length of deformable material; wherein in response to a pull-out force applied to the drive tower, the tension spring is configured to compress allowing the first tower side arm to extend away from the second wheel side arm thereby causing the camber of the drive wheel gearbox and the drive wheel to become less positive;

wherein the central length of the retaining bolt is secured on a first end to the first retaining surface and on a second end to the second retaining surface; wherein the retaining bolt extends though the first tower side arm and the second wheel side arm; wherein the retaining bolt slidably extends through the first tower side arm;

wherein the retaining bolt extends through the center of the tension spring; wherein the tension spring is compressively held by the retaining bolt between the first retaining surface and the second retaining surface; further wherein the second retaining surface is integrated with the second wheel side arm such that tension force applied by the tension spring to the second retaining surface is applied to the second wheel side arm;

wherein the second wheel side arm comprises a lower pivot hinge; wherein the central length of the retaining bolt extends through second wheel side arm at the lower pivot hinge; further wherein the retaining bolt is secured to the lower pivot hinge by the securing nut.

* * * * *